United States Patent
Wienberg

(12) 
(10) Patent No.: US 10,722,944 B2
(45) Date of Patent: Jul. 28, 2020

(54) ADDITIVE MANUFACTURING SYSTEM AND METHOD FOR ADDITIVE MANUFACTURING OF COMPONENTS

(71) Applicant: Airbus Operations GmbH, Hamburg (DE)

(72) Inventor: Thorsten Michael Wienberg, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 358 days.

(21) Appl. No.: 15/446,268

(22) Filed: Mar. 1, 2017

(65) Prior Publication Data

US 2017/0252806 A1    Sep. 7, 2017

(30) Foreign Application Priority Data

Mar. 4, 2016   (DE) .......................... 10 2016 203 582

(51) Int. Cl.
*B22F 3/105* (2006.01)
*B23K 26/342* (2014.01)
(Continued)

(52) U.S. Cl.
CPC ........ *B22F 3/1055* (2013.01); *B23K 26/0823* (2013.01); *B23K 26/0853* (2013.01);
(Continued)

(58) Field of Classification Search
CPC ............ B22F 3/1055; B22F 2003/1057; B22F 2003/1058; B22F 2003/1056;
(Continued)

(56) References Cited

U.S. PATENT DOCUMENTS

| 10,073,434 B1* | 9/2018 | Hollander ............... G05B 19/31 |
| 2004/0045941 A1* | 3/2004 | Herzog .................. B23K 26/02 |
| | | 219/121.6 |

(Continued)

FOREIGN PATENT DOCUMENTS

| CN | 1048996 A | 2/1991 |
| CN | 102083615 A | 6/2011 |

(Continued)

OTHER PUBLICATIONS

I Gibson, D.W. Rosen and B. Stucker (2010): Additive Manufacturing Technologies, Springer. ("Gibson"). (Year: 2010).*

(Continued)

*Primary Examiner* — Jessee R Roe
*Assistant Examiner* — Rebecca Janssen
(74) *Attorney, Agent, or Firm* — Greer, Burns & Crain, Ltd.

(57) ABSTRACT

A system for the additive manufacturing of components includes a powder receptacle, which is designed to receive a powdered material in the form of a starting material for a component to be manufactured, a construction platform that is mounted within the powder receptacle and is mounted so as to rotate relative to the powder receptacle about a rotational shaft, a lowering drive, which is designed to incrementally or continuously lower the construction platform within the powder receptacle, and an energy input apparatus, which is arranged above an opening in the powder receptacle and is designed to carry out locally selective melting or hardening of a powdered material introduced into the powder receptacle on a surface of the material. The construction platform can be tilted by an angle of inclination relative to a rotational shaft of the rotatable mount.

5 Claims, 1 Drawing Sheet

(51) Int. Cl.
*B23K 26/08* (2014.01)
*B33Y 10/00* (2015.01)
*B33Y 50/02* (2015.01)
*B23K 26/70* (2014.01)
*B29C 64/153* (2017.01)
*B29C 64/241* (2017.01)
*B29C 64/245* (2017.01)
*B23K 103/10* (2006.01)
*B33Y 30/00* (2015.01)

(52) U.S. Cl.
CPC .......... *B23K 26/342* (2015.10); *B23K 26/702* (2015.10); *B33Y 50/02* (2014.12); *B22F 2003/1056* (2013.01); *B22F 2003/1057* (2013.01); *B22F 2003/1058* (2013.01); *B22F 2998/10* (2013.01); *B23K 2103/10* (2018.08); *B29C 64/153* (2017.08); *B29C 64/241* (2017.08); *B29C 64/245* (2017.08); *B33Y 10/00* (2014.12); *B33Y 30/00* (2014.12); *Y02P 10/295* (2015.11)

(58) Field of Classification Search
CPC .............. B22F 2998/10; B23K 26/342; B23K 26/0853; B23K 26/0823; B23K 26/702; B23K 2103/10; Y02P 10/295; B29C 64/245; B29C 64/153; B29C 64/241; B33Y 30/00; B33Y 10/00; B33Y 50/02
See application file for complete search history.

(56) References Cited

U.S. PATENT DOCUMENTS

| 2004/0265413 | A1 | 12/2004 | Russell et al. | |
|---|---|---|---|---|
| 2006/0108712 | A1 | 5/2006 | Mattes | |
| 2008/0109102 | A1 | 5/2008 | Sutcliffe | |
| 2016/0067923 | A1* | 3/2016 | James | B29C 64/153 264/497 |
| 2017/0291372 | A1* | 10/2017 | Milshtein | B33Y 10/00 |
| 2017/0304894 | A1* | 10/2017 | Buller | B22F 3/105 |

FOREIGN PATENT DOCUMENTS

| CN | 103753968 A | 4/2014 |
|---|---|---|
| CN | 104890240 A | 9/2015 |
| CN | 204867411 U | 12/2015 |
| DE | 10053741 | 2/2002 |
| DE | 10235434 | 2/2004 |
| DE | 102009046440 | 5/2011 |
| DE | 102012107297 | 6/2014 |
| DE | 102013210242 | 12/2014 |
| DE | 102014011230 | 1/2016 |
| WO | 2015139094 | 9/2015 |

OTHER PUBLICATIONS

German Office Action, dated May 19, 2017, priority document.
German Search Report, dated Feb. 9, 2017, priority document.

* cited by examiner

ADDITIVE MANUFACTURING SYSTEM AND METHOD FOR ADDITIVE MANUFACTURING OF COMPONENTS

CROSS-REFERENCES TO RELATED APPLICATIONS

This application claims the benefit of the German patent application No. 10 2016 203 582.7 filed on Mar. 4, 2016, the entire disclosures of which are incorporated herein by way of reference.

FIELD OF THE INVENTION

The invention relates to a system for the additive manufacturing of components and to a method for the additive manufacturing of components, in which it is possible to improve the spatial positioning of the semi-finished component during manufacturing, in particular for use in the production of components having improved material properties in the aerospace industry.

BACKGROUND OF THE INVENTION

Stereolithography (SLA), selective laser sintering (SLS) and selective laser melting (SLM) belong to the group of generative manufacturing methods and are also generally also referred to as "3D printing methods." In this case, data sets are generated on the basis of geometric models, which data sets are used in a special generative manufacturing system for producing objects having a predefined shape from amorphous materials such as liquids and powders or neutrally shaped semi-finished products such as band-shaped, wire-shaped or strip-shaped material by means of chemical and/or physical processes. 3D printing methods use additive processes in which the starting material is built up sequentially in layers to form predetermined shapes.

3D printing methods are currently widely used in producing prototypes or in rapid product development (RPD), in which a resource-efficient process chain is used for small-scale and large-scale series production, as required, of individualized components. 3D printing methods have various uses in civil engineering, in architecture, in dental technology, in toolmaking, in implantology, in industrial design, in the automotive industry and in the aerospace industry.

3D printers, and in particular laser sintering devices, use both a computer-aided construction system (computer-aided design, CAD) and a beam system which carries out the generative layer construction of the object to be printed on the basis of the digital manufacturing model provided by the CAD system. A three-dimensional CAD model of the object to be printed undergoes a preparation procedure here which is carried out in order to generate the control data required for the beam system and is known as "slicing." In this process, the CAD model is digitally broken down into layers of a predetermined uniform thickness having layer normals in the construction direction of the beam system, which layers then form the basis for controlling the beam of energy on the starting material surface in the beam system. A conventional layer breakdown algorithm constructs the CAD model on an inlaid surface model in this case, which results in a number of closed curves or surface polygons which define the "slices" between two model sections which are in succession in a manner perpendicular through the construction direction of the beam system.

Surface models of this kind can be stored for example in STL format, which is conventional for stereolithography and which describes the surface geometry of the three-dimensional object to be printed in the form of raw data having unstructured triangle textures. The beam system reads the surface model data and converts the data into a corresponding control pattern for the laser beam in an SLA, SLS or SLM manufacturing method.

3D printing methods such as SLA, SLS or SLM result in significant design freedom in terms of geometrical shape and structure when manufacturing complex three-dimensional components. In this case, it is desirable to accelerate the manufacture of components by carrying out manufacturing steps more efficiently.

Various approaches in the prior art deal with 3D printing processes that are based on a rotational movement of construction platforms: DE 10 2013 210 242 A1 discloses a system for selective laser melting using a pot-shaped powder-bed support which can be rotated during powder-bed production. DE 10 2009 046 440 A1 discloses a device for the generative production of a component, comprising a lowerable support plate and a material supply unit rotating above the support plate. DE 102 35 434 A1 discloses a device for the layered, generative production of three-dimensional objects, comprising a rotatable construction region. US 2008/0109102 A1 and US 2004/0265413 A1 each disclose a 3D printing device comprising a rotatable construction platform. WO 2015/139094 A1 discloses a computer-controlled system for the generative manufacturing of components, which comprises a robotic arm that is mounted in a hardenable liquid and comprises a construction platform mounted thereon so as to rotate and tilt.

SUMMARY OF THE INVENTION

One of the problems addressed by the invention is to find more efficient solutions, in particular in such manufacturing methods, for the generative manufacturing of objects that are produced from powdered starting materials by means of selective laser sintering methods, selective laser melting methods or stereolithography methods.

According to a first aspect of the invention, a system for the additive manufacturing of components comprises a powder receptacle, which is designed to receive a powdered material in the form of a starting material for a component to be manufactured, a construction platform that is mounted within the powder receptacle and is mounted so as to rotate relative to the powder receptacle about a rotational shaft, a lowering drive, which is designed to incrementally or continuously lower the construction platform within the powder receptacle, and an energy input apparatus, which is arranged above an opening in the powder receptacle and is designed to carry out locally selective melting or hardening of a powdered material introduced into the powder receptacle on a surface of the material. Here, the construction platform can be tilted by an angle of inclination relative to a rotational shaft of the rotatable mount.

According to a second aspect of the invention, a method for the additive manufacturing of components comprises the steps of introducing a powder bed of powdered material into a powder receptacle in the form of a starting material for a component to be manufactured, locally selectively melting or hardening the powdered material on a surface of the powder bed by means of an energy input apparatus arranged above an opening in the powder receptacle, rotating a construction platform that is rotatably mounted within the powder receptacle about a rotational shaft during the locally selective melting or hardening, and incrementally or continuously lowering the construction platform within the powder receptacle. Here, the construction platform is tilted by an angle of inclination relative to the rotational shaft during the rotation.

According to a third aspect of the invention, computer-executable instructions are stored on a non-volatile computer-readable storage medium and, when executed by means of a data processing device, prompt the data processing device to carry out the steps of a method according to the second aspect of the present invention.

An essential concept of the invention comprises equipping powder bed manufacturing systems with a rotatable and tiltable construction platform which can be oriented in the powder bed and can be rotated under a substantially stationary energy input apparatus during a sintering or melting process. As a result, in particular, rotationally symmetrical workpieces can be manufactured particularly efficiently and with a high level of precision, since it is not necessary to move and adjust the energy input apparatus, or this is only necessary to a small extent.

3D printing processes are advantageous in general, and specifically the variants described herein are advantageous in particular for component manufacturing since they make it possible to produce three-dimensional components in primary shaping methods without the need for special manufacturing tools adapted to the outer shape of the components. This allows for highly efficient, material-saving and time-saving production processes for components. 3D printing methods of this kind are particularly advantageous for structural components in the aerospace field, since a large number of different components are used here which are adapted to specific uses and can be produced in 3D printing methods of this kind with low costs, low production lead times and little complexity in the manufacturing systems required for production.

Because it is possible to selectively tilt a rotating construction platform for the workpieces to be manufactured or to incline the platform plane thereof relative to the rotational shaft by an angle of inclination, there is the option of manufacturing even more heavily inclined undercuts or overhangs, from which an applied powder layer would otherwise slip off. In addition, owing to the construction platform being in an inclined position, additional structural modifications can be made to portions of the workpiece that have already hardened and would lie below the powder-bed surface if a platform were not inclined and therefore would be inaccessible for the selective hardening.

Advantageous embodiments and developments are set out in the further dependent claims and in the description with reference to the drawings.

According to some embodiments of the system and method according to the invention, the powdered material may comprise a metal powder.

According to some other embodiments of the system and method according to the invention, the powder receptacle and/or the construction platform may be cylindrical.

According to some other embodiments of the system according to the invention, the system may further comprise a powder reservoir, which is designed to feed additional powdered material into the powder receptacle, and a powder-removal device, which is designed to remove the powdered material additionally fed in from the powder reservoir from the powder surface in order to smooth the surface.

According to some other embodiments of the system according to the invention, the lowering drive may comprise a worm gear driven by a lowering drive motor.

According to some other embodiments of the system according to the invention, the system may further comprise a rotary table rigidly connected to the rotational shaft, and one or more ball bearings, which rotatably mount the construction platform on the rotary table. In some embodiments, a rotary drive motor and a rotary drive shaft, which is driven by the rotary drive motor, may be provided, the rotary drive shaft driving the construction platform to rotate about the rotational shaft on the rotary table.

According to some other embodiments of the system according to the invention, the energy input apparatus may comprise a laser that is focused on the powder surface in a punctiform or linear manner.

According to some other embodiments of the method according to the invention, the locally selective melting or hardening may be carried out by means of a laser that is focused on the powder surface in a punctiform or linear manner.

According to some other embodiments of the method according to the invention, the method may further comprise the step of changing the angle of inclination once the construction platform has been lowered by a predetermined distance. In some embodiments, once the angle of inclination of the construction platform has been changed, additional powdered material is fed into the powder receptacle from a powder reservoir.

The above embodiments and developments can, where appropriate, be combined with one another as desired. Further possible embodiments, developments and implementations of the invention also include combinations of features of the invention which are described above or below in connection with the embodiments, even if those combinations are not mentioned explicitly. In particular, a person skilled in the art will also add individual aspects as improvements or additions to each basic form of the present invention.

BRIEF DESCRIPTION OF THE DRAWINGS

In the following, the present invention is described in greater detail on the basis of the embodiments set out in the schematic drawings, in which.

Figure 1:
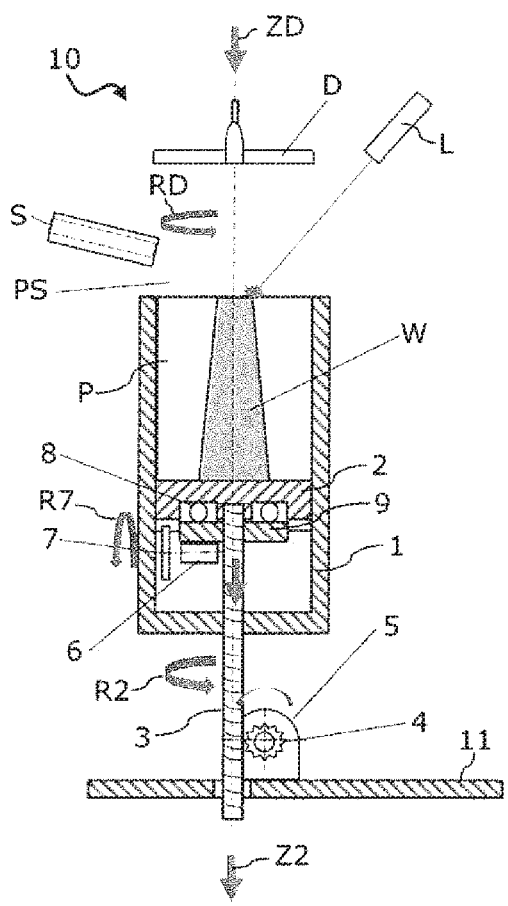
FIG. 1 is a schematic view of a system for the additive manufacturing of components in accordance with an embodiment of the invention.

The accompanying drawings are intended to provide greater understanding of the embodiments of the invention. They illustrate embodiments and, together with the description, they serve to explain principles and concepts of the invention. Other embodiments and many of the mentioned advantages will become apparent with reference to the drawings. The elements of the drawings are not necessarily shown to scale relative to one another. Terms specifying direction, such as "upper," "lower," "left," "right," "above,"

"below," "horizontal," "vertical," "front," "rear" and similar details are used merely for explanatory purposes and are not intended to restrict the generality to specific embodiments as shown in the drawings.

In the figures of the drawings, identical, functionally identical and identically operating elements, features and components have each been provided with the same reference signs, unless indicated otherwise.

DETAILED DESCRIPTION OF THE PREFERRED EMBODIMENTS 3D printing methods within the context of the present application include all generative manufacturing methods in which objects having a predefined shape are produced, on the basis of geometric models, from amorphous materials such as liquids and powders or neutrally shaped semi-finished products such as band-shaped, wire-shaped or strip-shaped material by means of chemical and/or physical processes in a special generative manufacturing system. In the context of the present application, 3D printing methods use additive processes in which the starting material is built up sequentially in layers to form predetermined shapes. In this case, 3D printing methods include in particular stereolithography (SLA), selective laser sintering (SLS) and selective laser melting (SLM). In the context of the present application, 3D printing methods, in particular, include additive manufacturing methods in which metal starting materials, such as liquefied metal or metal powder, are used for the generative manufacturing of components.

FIG. 1 is a schematic view of a system 10 for the additive or generative manufacturing of components, referred to in the following as a 3D printing device 10. The 3D printing device 10 can, for example, be a system for selective laser sintering, a system for selective laser melting or a stereolithography system. In the following, the basic principles of the 3D printing device 10 are explained by way of example in conjunction with SLS, although printing devices for other 3D printing methods may have a different structure.

An energy input apparatus, for example a $CO_2$ laser L, emits an energy beam, in a locationally selective manner, to a specific part of a powder surface of a powdered material P, which lies on a construction platform 2 in a working chamber 1 designed as a powder receptacle. The powder receptacle 1 may, for example, be generally pot-shaped, and may take the outer shape of a hollow cylinder or hollow box. Accordingly, the construction platform 2 may for example be a cylindrical disc of low thickness, of which the diameter is somewhat smaller than the diameter of the powder receptacle 1, such that it is possible for the construction platform 2 to rotate within the powder receptacle 1 about a rotational shaft 3.

The energy input apparatus L may, for example, be a laser mounted so as to be stationary, which, by means of an optical deflecting device (not explicitly shown) such as an assembly of movable or tiltable mirrors, deflects the laser beam onto a certain part of the powder surface of the powder P depending on the tilted position of the assembly and focuses the laser beam on the powder surface. The powdered material P may, for example, be a metal powder or a metal-alloy powder, such as AlMgSc (Scalmalloy®).

It may also be possible to use a linear laser as an energy input apparatus L, which projects a laser beam in a line towards the powder surface of the powder P and images it at this point in a focused manner by means of suitable refractive lenses such as Powell lenses or cylindrical lenses. If the powder receptacle 1 or construction container 2 is cylindrical, the laser line can be projected radially from the center of the construction platform 2 towards the edge of the powder receptacle 1.

The powder P is locally heated at the point of impact of the laser beam or laser line such that the powder particles are locally melted and form an agglomerate when cooled. The laser beam scans the powder surface in accordance with a digital manufacturing model which is provided by a CAD system and is optionally processed. After the selective melting and local agglomeration of the powder particles in the surface layer of the powder P, excess powder which is not agglomerated can be transferred to an excess container (not shown) if necessary. The construction platform 2 is then lowered and new powder PS is input into the powder receptacle 1 from a powder reservoir S. The powder surface can be smoothed by means of a powder-removal device D, such as a levelling roller or another suitable doctor apparatus or roller apparatus. In order to accelerate the melting process, the input powder PS from the powder reservoir S can be preheated by infrared light to a working temperature which is just below the melting point of the powder. The entire system 10 may be received in a housing (not explicitly shown), which is kept in an evacuated atmosphere and/or inert gas atmosphere.

In this way, a three-dimensional sintered or "printed" object or workpiece W made of agglomerated powder is produced in an iterative generative construction process. In this case, the surrounding powder supports the part of the object W constructed so far, meaning that no external support structure is necessary. The incremental, continuous downward movement Z2 of the construction platform 2 results in layered model generation of the workpiece W.

For the downward movement Z2, the 3D printing device 10 comprises a lowering drive, which can incrementally or continuously lower the construction platform 2 within the powder receptacle 1. For this purpose, the construction platform 2 is mounted on a rotational shaft 3, which extends vertically through a base of the powder receptacle 1. The lowering drive may, for example, comprise a worm gear 4 driven by a lowering drive motor 5, which worm gear is in engagement with an external thread of the rotational shaft 3 and converts a rotational movement of the shaft of the lowering drive motor 5 into a translational movement of the rotational shaft 3 in the direction Z2.

The construction platform 2 is also mounted so as to rotate relative to the powder receptacle 1 about the rotational shaft 3. For this purpose, the 3D printing device 10 may comprise a rotary table 9 which is rigidly connected to the rotational shaft 3 and on which the construction platform 2 is rotatably mounted by means of one or more ball bearings 8. A rotary drive motor 6 transmits a rotational movement to a rotary drive shaft 7 that is driven by the rotary drive motor 6 and in turn is in engagement with a corresponding thread on the underside of the construction platform 2. As a result, a rotational movement R7 of the rotary drive shaft 7 can be converted into a rotation of the construction platform 2 about the rotational shaft 3 on the rotary table 9.

During the additive manufacturing of a workpiece W, the powder bed of the powdered material P as a starting material for the additive manufacturing is added up to a specific height within the powder receptacle 1. The energy input apparatus L locally selectively melts or hardens certain regions on a surface of the powdered material P introduced into the powder receptacle 1. For this purpose, the construction platform 2 is rotated during the input of energy by correspondingly actuating the rotary drive motor 6, such that the energy input apparatus L covers a predetermined melting or hardening path owing to the rotation of the construction platform 2.

When a layer of the workpiece W is melted or hardened again as intended, the lowering drive can lower the construction platform 2 by a specific lowering distance such that powdered material PS can again be fed into the powder receptacle 1 from a powder reservoir S. In order to smooth the surface of the powder that is fed in, the 3D printing device 10 may comprise a powder-removal device D such as a doctor or a levelling roller, which is designed to remove powdered material PS additionally fed in from the powder reservoir S from the powder surface. Here, the powder-removal device D can be lowered in the direction ZD onto the powder surface, and the excess powder is removed in a rotational movement RD.

Figure 2:
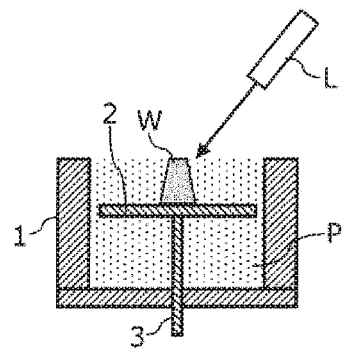
FIG. 2 is a schematic view of a detail of the system for the additive manufacturing of components according to FIG. 1 in accordance with another embodiment of the invention.
Figure 3:
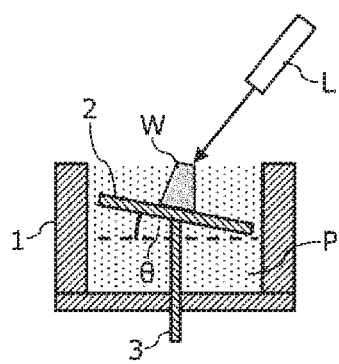
FIG. 3 is a schematic view of another detail of the system for the additive manufacturing of components according to FIG. 1 in accordance with another embodiment of the invention.

FIGS. 2 and 3 are exemplary schematic views of details of a 3D printing device 10 in the region of the powder receptacle 1 from FIG. 1. In this case, it should be clear that features and groups of features of the embodiments described in FIGS. 2 and 3 can also be applied to the embodiment in FIG. 1.

FIG. 2 shows the powder receptacle 1, in which the plane of the construction platform 2 is oriented perpendicularly to the rotational shaft 3, i.e., such that the construction platform 2 extends at right angles to the rotational shaft 3 within the powder receptacle 1. This means that additionally introduced powder P is distributed over the construction platform 2 to a substantially even thickness.

FIG. 3 then shows that the plane of the construction platform 2 can be tilted relative to the rotational shaft 3 by an angle of inclination θ. In other words, the construction platform 2 may be tilted relative to the rotational shaft 3 such that the construction platform 2 extends within the powder receptacle 1 so as to be inclined. When the construction platform 2 rotates about the rotational shaft 3, additionally introduced powder P will thus remain on those portions of an already partially manufactured workpiece W that extend horizontally relative to the rotational shaft 3 in the tilted position of the construction platform 2. In particular, for overhangs and undercuts of the workpiece W that are to be manufactured, the energy input apparatus L can therefore input energy into regions of the powder bed which would not be reached in a horizontal, i.e., not tilted, position of the construction platform 2.

Figure 4:
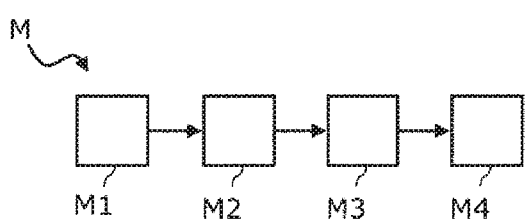
FIG. 4 is a block diagram of a method for the additive manufacturing of components in accordance with another embodiment of the invention.

FIG. 4 is a block diagram of a schematic sequence of a 3D printing method M for producing additively manufactured components, for example components or workpieces W of the type that can be produced in a 3D printing device such as the 3D printing device 10 shown in FIGS. 1 to 3. Here, the 3D printing method M can use the infrastructure of the 3D printing devices 10, as has been explained in conjunction with FIGS. 1 to 3.

In a first step M1, a powder bed of powdered material P is first introduced into a powder receptacle 1 in the form of a starting material for a component W to be manufactured. By locally selectively melting or hardening the powdered material on a surface of the powder bed by means of an energy input apparatus L arranged above an opening in the powder receptacle 1 in a second step M2—for example by means of a laser focused on the powder surface in a punctiform or linear manner—during the rotation of a construction platform 2 rotatably mounted within the powder receptacle 1 about a rotational shaft 3 in a third step M3, a workpiece W can be generatively manufactured in layers. For this purpose, in a fourth step M4, the construction platform 2 can be incrementally or continuously lowered within the powder receptacle 1. During the rotation in step M3, the construction platform 2 is tilted relative to the rotational shaft 3 by an angle of inclination θ.

Once the construction platform 2 has been lowered by a predetermined distance, the angle of inclination θ can be optimally changed in order to provide better accessibility for the locally selective melting or hardening process in relevant overhang or undercut regions of the workpiece W. Once the angle of inclination θ of the construction platform 2 has been changed in each case, additional powdered material PS is fed into the powder receptacle 1 from a powder reservoir S.

The method described can be used in general in all areas of the transport industry, for example for road motor vehicles, for rail vehicles or for watercraft, but also in civil engineering and mechanical engineering.

Figure 5:
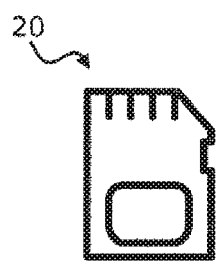
FIG. 5 is a schematic view of a computer-readable storage medium in accordance with a further embodiment of the invention.

FIG. 5 is a schematic view of a non-volatile or non-transitory computer-readable storage medium 20, on which computer-executable instructions are stored which, when executed on a data processing device, prompt the data processing device to carry out the steps of the 3D printing method M explained in conjunction with FIG. 4. The storage medium 20 may, for example, comprise an SD card, a USB flash drive, a floppy disk, a CD, a DVD or a similar suitable medium.

In the above detailed description, various features have been combined in one or more examples to improve the accuracy of the explanation. However, it should nevertheless be clear that the above description is merely illustrative and in no way limiting in nature. It is intended to cover all alternatives, modifications and equivalents of the various features and embodiments. Many other examples will be immediately and directly apparent to a person skilled in the art from the above description in view of his expert knowledge.

The embodiments have been selected and described so as to be able to explain the principles behind the invention and the possible practical applications thereof as clearly as possible. This makes it possible for persons skilled in the art to modify and use the invention and the various embodiments thereof in an optimal manner for the intended purpose of use. In the claims and description, the terms "containing" and "having" are used as neutral terminology for the corresponding term "comprising." Furthermore, use of the terms "a" and "an" and "one" is not in principle intended to exclude the possibility of a plurality of the features and components described in this manner

The invention claimed is:

1. A method for the additive manufacturing of components, the method comprising:
   introducing a powder bed of powdered material into a powder receptacle in the form of a starting material for a component to be manufactured;
   locally selectively melting or hardening the powdered material on a surface of the powder bed via stationary energy input apparatus arranged above an opening in the powder receptacle;
   rotating a construction platform, rotatably mounted within the powder receptacle, about a rotational shaft while the powdered material is being melted or hardened by the stationary energy input apparatus;
   either incrementally or continuously lowering the construction platform within the powder receptacle, the construction platform being tilted by an angle of inclination relative to the rotational shaft during the rotation;

changing the angle of inclination once the construction platform has been lowered by a predetermined distance; and feeding additional powdered material into the powder receptacle from a powder reservoir once the angle of inclination of the construction platform has been changed.

2. The method of claim 1, wherein the powdered material comprises a metal powder.

3. The method of claim 1, wherein at least one of the powder receptacle or the construction platform are cylindrical.

4. The method of claim 1, wherein the locally selective melting or hardening is carried out by means of a laser focused on the powder surface in either a punctiform or linear manner.

5. A non-transitory computer-readable storage medium, on which computer-executable instructions are stored which, when executed on a data processing device, prompt the data processing device to carry out the steps of a method for the additive manufacturing of components, the method comprising:

introducing a powder bed of powdered material into a powder receptacle in the form of a starting material for a component to be manufactured;

locally selectively melting or hardening the powdered material on a surface of the powder bed via a stationary energy input apparatus arranged above an opening in the powder receptacle;

rotating a construction platform, rotatably mounted within the powder receptacle, about a rotational shaft while the powdered material is being melted or hardened by the stationary energy input apparatus; and either incrementally or continuously lowering the construction platform within the powder receptacle, the construction platform being tilted by an angle of inclination relative to the rotational shaft during the rotation changing the angle of inclination once the construction platform has been lowered by a predetermined distance; and feeding additional powdered material into the powder receptacle from a powder reservoir once the angle of inclination of the construction platform has been changed.

* * * * *